Sept. 22, 1970     E. CARMICHAEL     3,529,380

LAWN AND FLOWER BED EDGING DEVICE

Filed Feb. 23, 1968

INVENTOR

EDWARD CARMICHAEL

BY

ATTORNEY

United States Patent Office 3,529,380
Patented Sept. 22, 1970

3,529,380
LAWN AND FLOWER BED EDGING DEVICE
Edward Carmichael, 314 Shrine,
San Antonio, Tex. 78221
Filed Feb. 23, 1968, Ser. No. 707,722
Int. Cl. B26d *1/20;* A01g *3/06*
U.S. Cl. 47—33                                6 Claims

ABSTRACT OF THE DISCLOSURE

A combined edging and trimming device adapted to multiple configurations designed for placing around trees, flower beds, or other areas desired to be kept free of grass. The principal components are a cutting bar to which is attached a multiplicity of cutter blade pivot points, a detachable cutter blade is placed at the selected point and depressed to trim or edge any grass projecting over the cutter bar in the selected area.

---

This invention relates to a border or edging device particularly suited for placing around trees or flower beds to accomplish a sharp, clear precisely trimmed dividing line between the lawn and the area desired to be kept free of grass.

The problem of edging the lawn is one which has plagued the homeowner for years. Numerous devices, both manually and power driven are well known in the art. Many of these devices, such as a gasoline or electric driven lawn edger, are highly acceptable for edging sidewalks or street curbs. These devices are not, however, adapted to edge around trees or flower beds.

Rolled lawn or flower bed edging materials of aluminum or plastic materials are widely used to retard grass growth into the flower bed and is to a degree successful. The device of this invention combines an edging function with an efficient cutting or trimming means.

The device of this invention comprises a cutting bar which may be either constructed of strap iron or angle iron materials. The cutting bar is constructed in various desired shapes or configurations. Anchoring stakes are secured to the cutting bar at several points to retain the cutting bar firmly anchored in the desired location. The multiplicity of cutter blade engaging parts are secured to and project diagonal from the cutting bar. The cutting blade is provided with a detent or engaging notch adapted to selectively engage any of the other points. The depressing of a handle of a cutting blade will shear the grass projecting over the cutting bar. A straight or curved blade may be used as desired to follow the configuration of the selected cutting bar.

One object of this invention was to solve the largely heretofore unsolved problems of edging and trimming around trees and flower beds.

Another object was to create a device capable of construction in a multiplicity of configurations adapted to edge an area of any shape, while also creating various patterns of ornamental designs.

Other objects and advantages will become apparent to these skilled in the art from a detailed study of the following description and views wherein like referenced characters refer to identical or similar components throughout the several views.

Figure 1:
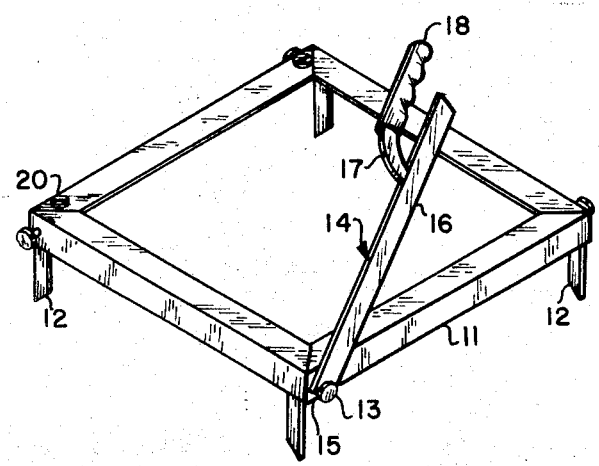
FIG. 1 is a perspective view of the device in a square configuration with the cutting blade in an operable position.
Figure 3:
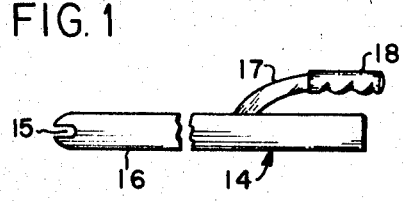
FIG. 3 is a side planed view of the cutting blade.

To illustrate a preferred method of constructing, reference is made to FIG. 1. The basic frame of the device is the angle iron cutting bar 11 attached to the cutting bar 11 at spaced intervals is a series of earth anchor stakes 12 designed to hold the device in position around a flower bed or a tree. Attached to the frame or cutting bar 11 is a series of blade pivot points 13, which can be operably engaged by a cutting blade 14 by means of the engaging notch 15. The details of the construction of the blade is illustrated in FIGS. 1 and 3, which illustrate the engaging notch 15, the shearing edge 16, the gooseneck handle 17 and the grip 18.

Figure 2:
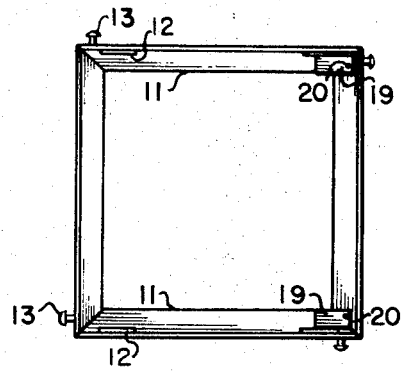
FIG. 2 is a bottom planned view of the angle iron cutting bar.

The angle iron configuration of the device illustrated in FIGS. 1 and 2 also illustrates the tree access brackets 19 and the bracket screws 20. Blade pivot points 13 and the anchor stakes 12 may be welded to the cutting bar 11 or otherwise securely attached by conventional construction methods. In the preferred embodiment, the substantially square configuration utilizing the angle iron cutting bar 11 was constructed by cutting the material at an angle at the corners and welding the sections together. A notching and bending process would, of course, be a satisfactory method of construction. As previously suggested, the anchor stakes 12 of the desired length may be cut from a suitable material and welded or otherwise securely attached to the cutting bar 11. The tree access brackets 19 can be welded to the cutting bar and the other end attached to a removable section of the cutting bar by means of bracket screws 20 to facilitate placing the device around a tree.

Figure 4:
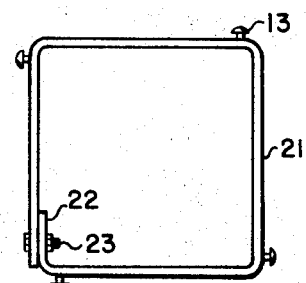
FIG. 4 is a top planed view of the device constructed from the strap iron.
Figure 5:
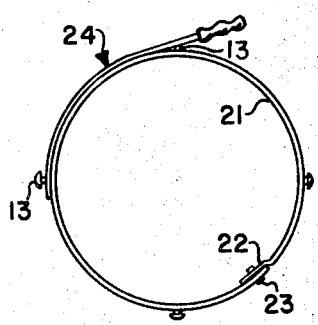
FIG. 5 is a top planed view of the device in a round configuration with a crescent shaped cutting bar attached.
Figure 6:
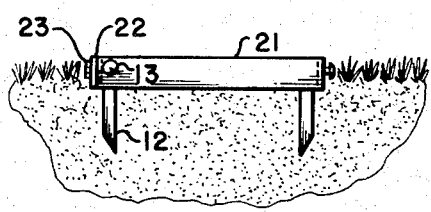
FIG. 6 is a side planed view of the device illustrated in FIG. 4.

A different means is provided for positioning the device around a tree in the species using the strap iron cutting bar 21 illustrated in FIGS. 4, 5, and 6. The strap iron cutting bar 21 when bent into the desired configuration may be constructed with a tree access overlap 22 which may be closed and secured by a bolt or overlap securing screw 23. A comparable tree access overlap 22 and securing screw 23 would be satisfactory for the round or oval configuration of the device illustrated in FIG. 5.

Figure 7:
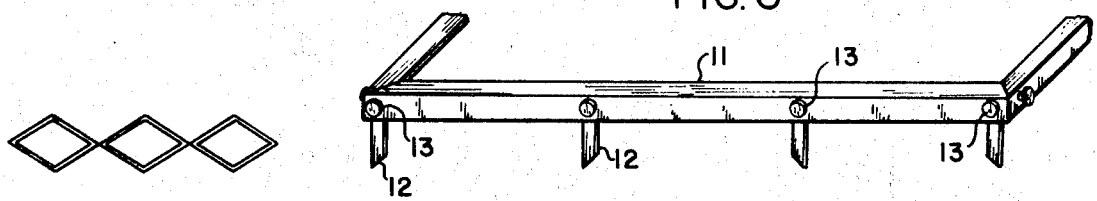
FIG. 7 illustrates an angle iron configuration of the cutting bar designed for use around a flower bed adjacent a building.

It is naturally understood that the foregoing illustrated concepts lend themselves to constructing the device in any configuration with slight changes in contours and designed shapes. If grass is to be trimmed along a straight section of the cutting bar 11, a coordinated location of selected blade pivot points 13 would permit the desired cut to be obtained by ultilizing the straight cutting blade 14. For oval or curved surfaces the crescent cutting blade 24 as suggested in FIG. 5 may be utilized. In constructing the device and utilization along the side of a house or an elongated flower bed, an elongated cutting bar 11 provided with a series of blade pivot points 13 will be required as illustrated in FIG. 7.

Figure 8:
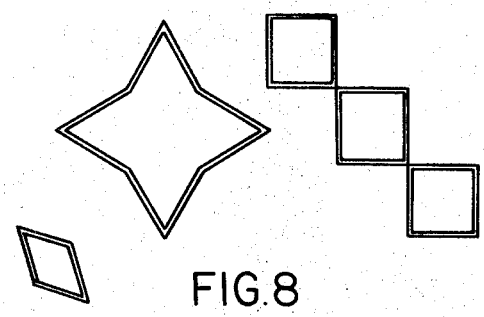
FIG. 8 is a top planed view suggesting a series of ornamental configurations in which the device may be constructed.

A variety of configurations of the device is possible in their manufactured design. In addition, a series of the devices may be connected or positioned together to create formal designs and accomplish ornamental and decorative landscaping. As is suggested above, some of these configurations are illustrated in FIG. 8.

In utilizing the angle iron species of the device around a tree, the grass should be removed from the area adjacent the tree. The bracket screws 20 are removed from the tree access brackets 19, a section of the cutting bar 11 can then be removed and the device placed around the tree and brackets 19 and screws 20 again secured. The anchor stakes 12 are then forced into the ground to the desired level in the lawn. After the device is placed in position, any grass growing over the cutting bar 11 is easily edged or trimmed by engaging the cutting blades 14 at a blade pivot point 13 by means of the engaging notch 15 and depressing the gooseneck handle 17 by grasping the grip 18 by the operator and depressing the cutting blade 14. By progressively engaging a series of pivot points 13 the desired area can be edged.

In placing the strap iron species of the device of FIGS. 4 and 5 around a tree after clearing the grass in the area the overlap securing screw 23 is removed and the device sprung open at the tree access overlap 22, then the device secured in its orginal configuration and forced into the ground to the desired depth.

The device has been illustrated in detail in two embodiments. A series of combinations and various designed configurations to create attractive landscaping patterns has been suggested. What is desired to be claimed is all embodiments and combinations which are apparent from a study of this disclosure and which readily occur to an operator when utilizing the device which do not depart from the inventive concept herein disclosed and within the equivalent scope of the appended claims.

I claim:
1. A lawn edging device comprising:
   (a) a cutting means,
   (b) said cutting means comprising a cutting bar constructed in a configuration including:
      (1) an inner edge for bordering a flower bed or the like and
      (2) an outer cutting edge adapted to contact in shearing engagement grass or the like,
   (c) anchor stakes fixedly attached to said cutting bar and adapted to retain said cutting bar firmly positioned in the earth,
   (d) a series of blade pivot points fixedly attached to said cutting bar and projecting outward from said cutting bar adapted to pivotally engage and retain a cutting blade parallel to and in shearing engagement with said outer cutting edge, and
   (e) said cutting means further comprising a cutting blade pivotally and detachably secured to one of said pivot points, said blade being parallel to and in close contact with said cutting edge in shearing proximity thereto in a lowered position.
2. The invention of claim 1 wherein said cutting blade is:
   (a) of such a length as to project from one said pivot point to any adjacent said pivot point,
   (b) an engaging notch in one end of said blade,
   (c) a gooseneck handle projecting upward from said blade, and
   (d) a grip mounted on the said gooseneck handle.
3. A lawn edging device comprising:
   (a) a cutting means,
   (b) said cutting means comprising a cutting bar, constructed in a configuration including:
      (1) an inner edge constituting a substantially complete enclosure adapted for bordering a flower bed or the like, and
      (2) an outer edge adapted to contact in shearing engagement said cutting means for trimming grass or the like,
   (c) a multiplicity of blade pivot points projecting outward from said cutting bar adjacent the outer edge of said cutting bar,
   (d) said cutting means further comprising a cutting blade of sufficient length to project from one said pivot point to an adjacent said pivot point constructed in a configuration paralleling the outer cutting edge of said cutting bar,
   (e) a pivot point engaging notch in said cutting blade and adjacent one end thereof, and pivotally engaging one of said pivot points to retain said cutting blade in contact and in shearing engagement with said outer edge of said cutting bar, and
   (f) an operating handle mounted on said cutting blade adapted to pivotally move said cutting blade.
4. The invention of claim 3 including earth anchor stakes secured to said cutting bar adapted to penetrate soil or the like and retain said cutting bar in a stable position.
5. The invention of claim 3 wherein said bar has end portions releasably secured to one another.
6. The invention of claim 3 wherein said bar is flexible and curved to form a generally circular configuration.

References Cited

UNITED STATES PATENTS

| 425,890 | 4/1890 | Landis | 47—33 |
| 619,352 | 2/1899 | Schaefer | 47—33 |
| 1,166,578 | 1/1916 | Clark | 30—244 XR |
| 1,857,383 | 5/1932 | Johnson | 239—201 XR |
| 2,654,180 | 10/1953 | Redfield | 47—33 |
| 3,279,063 | 10/1966 | Chalup | 56—241 XR |

ROBERT E. BAGWILL, Primary Examiner

U.S. Cl. X.R.

30—253